United States Patent
Froeberg

(10) Patent No.: US 8,214,141 B2
(45) Date of Patent: *Jul. 3, 2012

(54) ROUTE EVALUATION SYSTEM

(75) Inventor: Peter Froeberg, Cupertino, CA (US)

(73) Assignee: RM Acquisition, LLC, Skokie, IL (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/546,426

(22) Filed: Aug. 24, 2009

(65) Prior Publication Data

US 2009/0312942 A1 Dec. 17, 2009

Related U.S. Application Data

(63) Continuation of application No. 11/200,975, filed on Aug. 10, 2005, now Pat. No. 7,580,791.

(51) Int. Cl.
*G01C 21/30* (2006.01)

(52) U.S. Cl. ..................... 701/400; 73/178 R
(58) Field of Classification Search ............... 701/200, 701/202, 207–211, 400, 408–414; 73/178 R; 340/988, 990, 995

See application file for complete search history.

(56) References Cited

U.S. PATENT DOCUMENTS

| | | | |
|---|---|---|---|
| 5,654,892 A | 8/1997 | Fujii et al. | |
| 5,862,509 A | 1/1999 | Desai et al. | |
| 5,913,919 A | 6/1999 | Bauer et al. | |
| 6,029,173 A | 2/2000 | Meek et al. | |
| 6,240,342 B1 | 5/2001 | Fiegert et al. | |
| 6,259,988 B1 | 7/2001 | Galkowski et al. | |
| 6,366,927 B1 | 4/2002 | Meek et al. | |
| 6,845,320 B2 * | 1/2005 | Tompkins et al. | ............ 701/209 |
| 7,167,180 B1 | 1/2007 | Shibolet | |
| 7,525,451 B2 * | 4/2009 | Yoshikawa et al. | ...... 340/995.13 |
| 7,580,791 B2 | 8/2009 | Froeberg | |
| 2005/0209772 A1 | 9/2005 | Yoshikawa et al. | |
| 2005/0246096 A1 | 11/2005 | Bracht et al. | |

FOREIGN PATENT DOCUMENTS

WO WO-93/05492 A1 3/1993

* cited by examiner

*Primary Examiner* — Dalena Tran
(74) *Attorney, Agent, or Firm* — Marshall, Gerstein & Borun LLP

(57) ABSTRACT

A route evaluation system includes a processor, a computer readable memory and a database that stores roadway data pertaining to a route. A first routine is arranged to obtain selected roadway data from the database. A second routine is arranged to determine a route from an origin to a destination based at least in part on the roadway data. A third routine is arranged to compute a set of navigation parameters for the route. A fourth routine is arranged to compare the set of navigation parameters to at least one vehicle maneuverability parameter of a vehicle.

24 Claims, 10 Drawing Sheets

VEHICLE MANEUVERABILITY PARAMETERS

LENGTH
WIDTH
HEIGHT
POWER
BRAKES
WEIGHT
TURN RADIUS

NAVIGATION PARAMETERS

ROAD WIDTH
CURVATURE
GRADE
WEIGHT BEARING CAPACITY
OVERPASSES
LOCAL ORDINANCES

FIG. 3

| ROUTE # | DESCRIPTION | SCORE | MINI MAP | DIST. | TIME |
|---------|-------------|-------|----------|-------|------|
| 1 | MAIN ST - EAST DR - SOUTH ST ... | 85 | 344 342 | 4.2 | 8 |
| 2 | 2nd ST - A AVE - 3rd ST ... | 72 | 344 342 | 2.5 | 5 |
| 3 | 2nd ST - A AVE - EAST DR ... | 60 | 344 342 | 3.6 | 7 |
| | | | | | |
| | | | | | |
| | | | | | |

FIG. 7

VEHICLE MANEUVERABILITY PARAMETERS

- LENGTH
- WIDTH
- HEIGHT
- POWER
- BRAKES
- WEIGHT
- TURN RADIUS

NAVIGATION PARAMETERS

- ROAD WIDTH
- CURVATURE
- GRADE
- WEIGHT BEARING CAPACITY
- OVERPASSES
- LOCAL ORDINANCES

FIG. 10

| ROUTE # | CODE | EQUIP AVAILABLE | DRIVER AVAILABLE |
|---|---|---|---|
| 1 | L-Y,S-G | L | EX |
| 2 | L-X,S-Y | S | NO |
| 3 | L-G,S-G | | |
| 4 | L-R,S-G | | |

L = LARGE   G = GREEN   X = NOT USABLE
S = SMALL   Y = YELLOW   EX = EXPERIENCED
            R = RED     NO = NOVICE

ROUTE EVALUATION SYSTEM

RELATED APPLICATION

This application is a continuation of pending U.S. patent application Ser. No. 11/200,975 filed Aug. 10, 2005 and entitled "Route Evaluation System," which is hereby expressly incorporated by reference herein.

FIELD OF THE DISCLOSURE

The present disclosure generally relates to navigation systems. More specifically, the present disclosure relates to a navigation system that determines and then evaluates a route for a vehicle.

BACKGROUND

Couriers, delivery and transportation companies need to determine the best route from an origin, such as a distribution center or a pick up point, to a destination, such as a delivery address. Currently, these organizations use navigation software and navigation databases to plan a route from the origin to the destination. For operations involving large trucks, several commercial databases are available which include information that enhances route planning. For example, a database may include roadway information such as weight bearing capacity, speed limit, and the presence of absence of dedicated turn lanes, among other information.

Commercially available route planning software and databases may lack certain types of information and/or route planning functionalities. For example, in many circumstances the destination is not located along a roadway included in the database, but instead the actual destination is located a mile or more from the "destination" stored in the database. This problem has come to be known within the transportation industry as the "last mile" problem.

Many times, a driver or vehicle operator nearing the actual destination encounters a problem that is not accounted for in the database. Because of the lack of information for the final portion of the route, many less precise and subjective methods have been developed in an effort to determine the navigability of the "last mile" of the route. These methods may include a subjective analysis of secondary attributes, such as, for example analyzing the Department of Transportation road classification, analyzing the name of the road (e.g. whether the road is a "Boulevard" or a "Lane"), analyzing the depiction of the route on a map (e.g. whether the route appears as a heavy line as opposed to a thin line), etc. Nevertheless, the approach described above does not always produce reliable results and may plan a route with sections which are impassable by certain vehicles. Additional techniques may be desired to determine if the "last mile" of a route is likely to be suitable for a particular vehicle.

SUMMARY

A first aspect of a route evaluation system may include a processor, a computer readable memory and a database that stores roadway data pertaining to a route. A first routine is stored in the memory, executable by the processor, and arranged to obtain selected roadway data from the database. A second routine is stored in the memory, executable by the processor, and arranged to determine a route from an origin to a destination based at least in part on the roadway data. A third routine is stored in the memory, executable by the processor, and arranged to compute a set of navigation parameters for the route. A fourth routine is stored in the memory, executable by the processor, and arranged to compare the set of navigation parameters to at least one vehicle maneuverability parameter.

A second aspect of the route evaluation system may include a set of vehicle maneuverability parameters arranged for storage on a computer readable medium and a set of roadway data arranged for storage on a computer readable medium. Further, a first routine may be executable by a processor and arranged to determine a selected route from an origin to a destination based at least in part on the set of roadway data. Still further, a second routine may be executable by a processor and arranged to determine a set of route navigation parameters based on the roadway data for a selected route, the set of route navigation parameters may be indicative of the suitability of the selected route.

A third aspect of the route evaluation system is a set of vehicle maneuverability parameters arranged for storage on a computer readable medium, a first routine executable by a processor and arranged to access a set of roadway data stored in a database and to determine a selected route from an origin to a destination based on the set of roadway data. Additionally, a second routine may be included which is executable by the processor and arranged to determine a set of route navigation parameters based on the roadway data pertaining to the selected route, the set of route navigation parameters is indicative of the suitability of the selected route.

The route evaluation system may be incorporated into an overall system that includes a vehicle, a computer and a communication device placeable in the vehicle and which communicates with the computer.

The route evaluation system may also be incorporated into a dispatch system that includes a computer and a communication device that allows communication with the vehicle.

Additionally, a method of evaluating a route includes the steps of defining a geographical area on a computer, retrieving roadway data from a database for the geographical area, creating a route from an origin to a destination within the geographical area, evaluating navigation parameters of the route and comparing the navigation parameters of the route to vehicle maneuverability parameters of a vehicle.

BRIEF DESCRIPTION OF THE DRAWINGS

FIG. 3 is one example of a display illustrating one possible combination of routes and route information returned by the route evaluation system of FIG. 1.

FIG. 7 is an exemplary listing of vehicle maneuverability parameters and route navigation parameters.

FIG. 10 is an exemplary display for a dispatch computer generated by the route evaluation system of FIG. 1.

DETAILED DESCRIPTION

Figure 1:
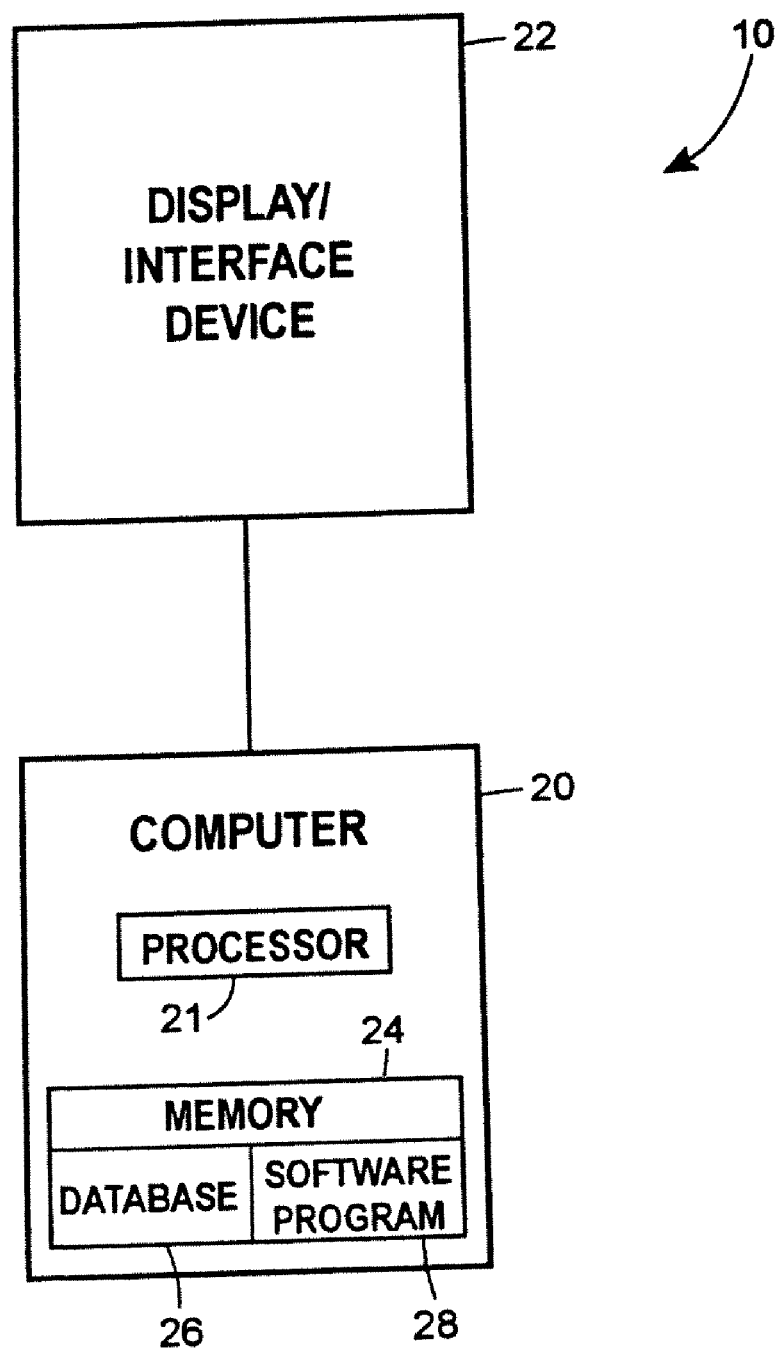
FIG. 1 is an architectural block diagram of one embodiment of a route evaluation system.

Referring now to FIG. 1, a route evaluation system 10 generally includes a computer 20 connected to a display/interface device 22 and having a memory 24. The memory 24 contains a database 26 and a software program 28. The software program 28, which is executable by a processor 21 of the computer 20, accepts user inputs via the display/interface device 22 and accesses the database 26 in order to determine a route for the user. In accordance with the disclosed example, the database 26 includes roadway data from a commercial roadway database. The database 26 may provide routes over highways and many major roads and map data specific to local area roads not included in the commercial roadway database. The roadway data retrieved from the database 26 may include, but is not limited to, geodetic street coordinates, associated shape geometry, road class, lane count and lane width.

Figure 2:
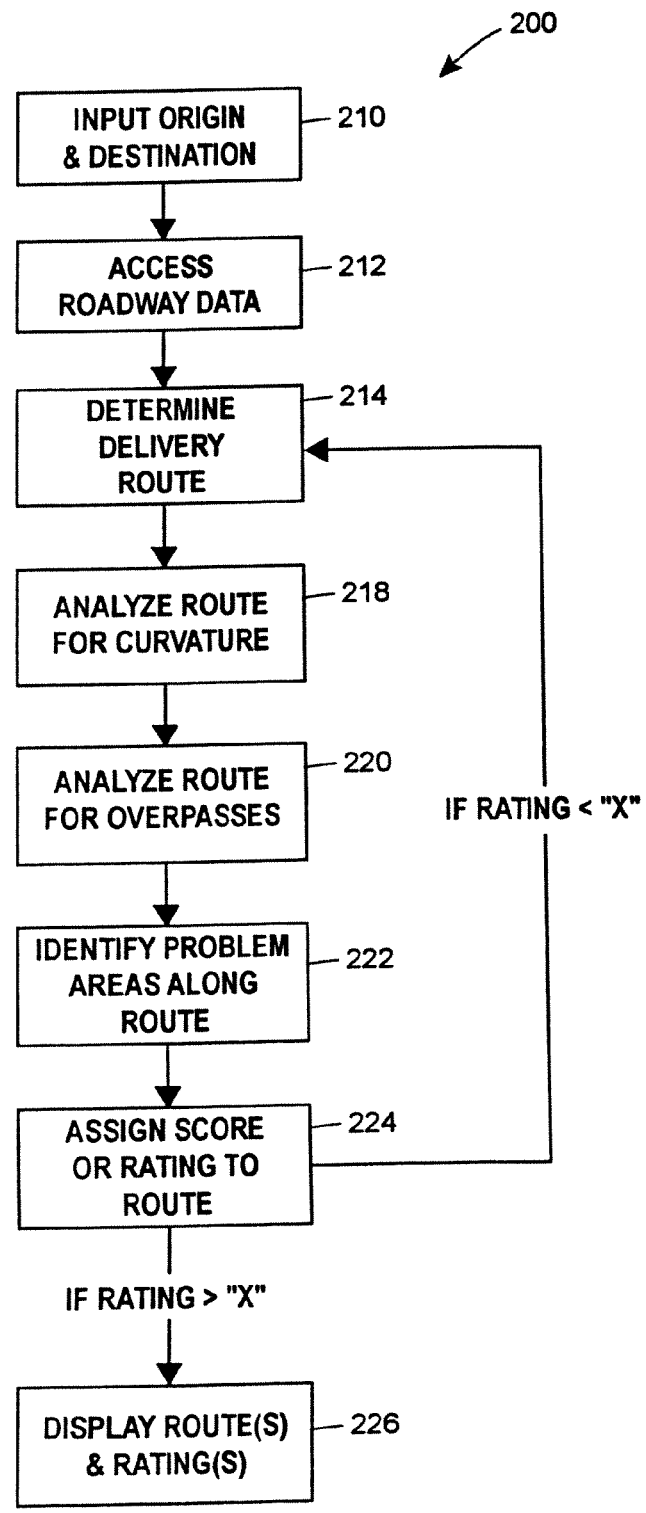
FIG. 2 is a logic diagram that may be used by the route evaluation system of FIG. 1.

FIG. 2 illustrates a logic diagram 200 which may be used by the software program 28 to determine a route from an ORIGIN to a DESTINATION based on user inputs at 210 via the display/interface device 22 of FIG. 1. After the user has input the ORIGIN and the DESTINATION, the user may also input vehicle maneuverability parameters at 210, which include, but are not limited to, a weight of the vehicle, a turning radius of the vehicle, a maximum road grade navigable by the vehicle, etc. The software program 28 then retrieves roadway data at 212 from the database 26. After accessing the database 26, the software program 28 determines a route from the ORIGIN to the DESTINATION at 214 using the roadway data from the database 26 and an optimization routine (not shown) that may include optimizing time of travel, distance, or any other parameter as determined by the user.

Once the route from the ORIGIN to the DESTINATION is determined, the software program 28 analyzes the route for navigation parameters at 218, 220. In the example of FIG. 2, these navigation parameters include, but are not limited to, the curvature of the route or the curvature of selected portions of the route, and the presence or absence of roadway or railway overpasses. A more detailed listing of exemplary navigation parameters is further discussed with reference to FIG. 7. Problem areas or areas which may be difficult for the vehicle to navigate are graphically and/or textually identified at 222. After analyzing the route with respect to the navigability parameters and identifying problem areas, a score or rating is assigned to the route at 224 based on the navigability parameters. If the score or rating is below a certain predetermined threshold value, the software program 28 determines another route at 214. The second route is analyzed as discussed above at 218, 220, 222 and 224. This process is repeated until a route is found having an acceptable score or rating (i.e., the score or rating exceeds the predetermined value). Once a route has been found with an acceptable score or rating, each route that was evaluated is returned at 226 to the display/interface device 22.

Alternatively, in another embodiment, the software program 28 creates a number of possible routes, and then, as outlined above assigns a score or rating to each route. This may be an alternative to, or in addition to, iteratively analyzing routes until the route score or rating exceeds the predetermined threshold value. For example, the software program 28 repeats the steps at 214, 218, 220, 222 and 224 for three possible routes with their corresponding scores or ratings returned at 226. The number of routes returned preferably is selectable and/or pre-programmable by the user.

FIG. 3 illustrates one possible embodiment of a display 300 which the software program 28 may employ in returning the routes analyzed at 218-224 (of FIG. 2) for user viewing. The display 300 includes several columns (310, 320, 330, 340, 350 and 360) which correspond to different characteristics of the routes analyzed. The route column 310 displays a number of the route that was analyzed. In the display 300 of FIG. 3, the routes are shown in order of highest score (or rating). However, the user may select any order of display; for example, the user may request that the routes be shown according to time of travel, not score. Regardless, the route number in the route number column 310 distinguishes one route from another.

The route description column 320 may include a brief written description of the route. Alternatively, the user may request a complete written description of the route for display in the route description column 320. Regardless, the information in the route description column 320 may include, but not be limited to, roadway names and turn directions among other information. Preferably, the route description is detailed enough for a user with some local area knowledge to determine the general route direction from the written description.

The score column 330 provides the overall score or rating of the route based on the route navigation parameters. The navigation parameters may be weighted differently according to the user's preferences. The score column 330 provides a quick comparison of the routes.

The map column 340 provides a graphical depiction of the route. The map in the map column 340 is selectable by the user to show a full depiction of the map should the user wish to view a more detailed version of the route. Alternatively, the user may elect to show a partial or full depiction of a selected portion of the route.

The distance column 350 displays the total distance from the ORIGIN 342 to the DESTINATION 344 along the route. The time column 360 displays an estimated travel time indicative of the time required to travel the route from the ORIGIN 342 to the DESTINATION 344. The estimated travel in the time column 360 is based on the total distance of the route and average travel speeds for each segment of the route. For example, the average speed a vehicle is expected to maintain on an interstate highway may be approximately 65 miles per hour, while the average speed a vehicle is expected to maintain on a city street may only be approximately 30 miles per hour. By taking into account each segment's distance and average speed, the software program 28 calculates the estimated travel time from the ORIGIN 342 to the DESTINATION 344.

Figure 4:
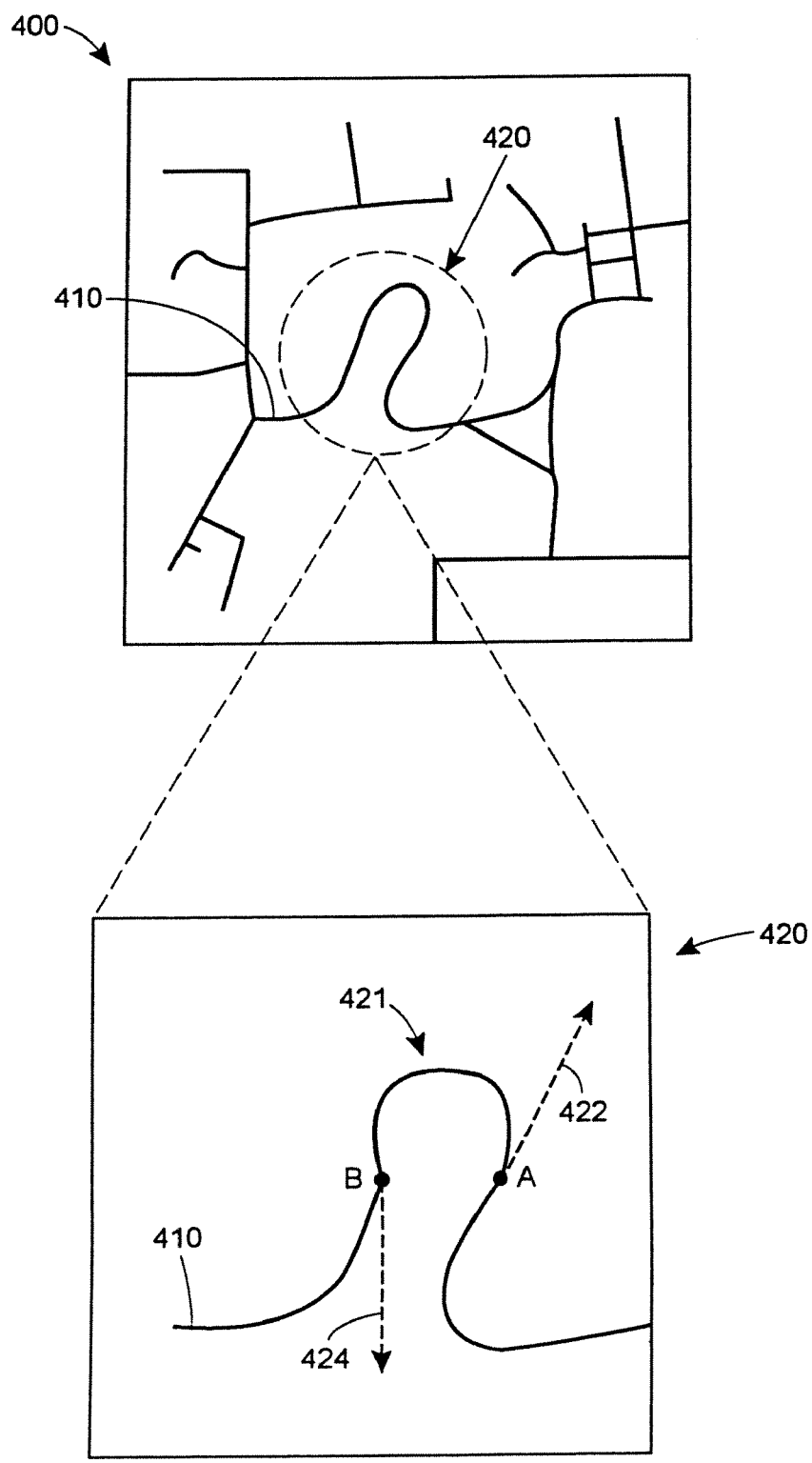
FIG. 4 graphically illustrates a portion of a route and an example of how a heading change may be based on the heading at points A and B and the distance between points A and B.

As discussed above with reference to FIG. 2 at 218, the route evaluation system checks a route for certain navigation parameters, one of which may be a heading change and, more specifically a total heading change as a function of distance traveled. FIG. 4 describes how the route evaluation system checks a portion of the route for the amount of heading change in a given distance. A typical roadmap display 400 is illustrated in FIG. 4. Assuming the road 410 has initially been chosen as part of the route, it is checked for heading change with respect to distance traveled, particularly in a selected portion 420 of the route, such as the curved region 421. In the lower part of FIG. 4, a magnified view of the selected portion 420 including the curved region 421 is shown. The route evaluation system checks for curvature by selecting a beginning point A for the curve and an ending point B for the curve. The route evaluation system then computes a line 422 which is tangent to the curve at point A, and this line 422 represents a heading for a vehicle entering the curved region 421. The route evaluation system similarly computes a line 424 which is tangent to the curve at point B, and this line 424 represents the heading of a vehicle exiting the curved region 421. The route evaluation system may use roadway specific data from the database 26, such as, for example, geodetic street coordinates or associated shape geometry, in the curvature calculations.

By computing the difference in vehicle heading at point A (represented by line 422) and the vehicle heading at point B (represented by the line 424), the route evaluation system determines a heading change between entry and exit of the curved portion 421. Further, the route evaluation system computes, or otherwise has access to, the distance between the entry point A and the exit point B. With these two values, the route evaluation system computes a navigation parameter called "heading change per distance traveled." The process described above may be iteratively repeated for a plurality of points along the curved region 421. Also, the entire route may be evaluated for curvature until the most restrictive value of the parameter "heading change per distance traveled" has been determined. Alternatively, the route evaluation system may determine all points along the route where the parameter "heading change per distance traveled" exceeds a predetermined value which may be selected by the user and which may be based on vehicle maneuverability parameters. Further, after determining the point(s) or area(s) along a route at which the comparison between the navigation parameter(s) and the vehicle maneuverability parameter(s) indicates a problem, the route evaluation system may highlight such regions graphically and/or textually.

Figure 5:
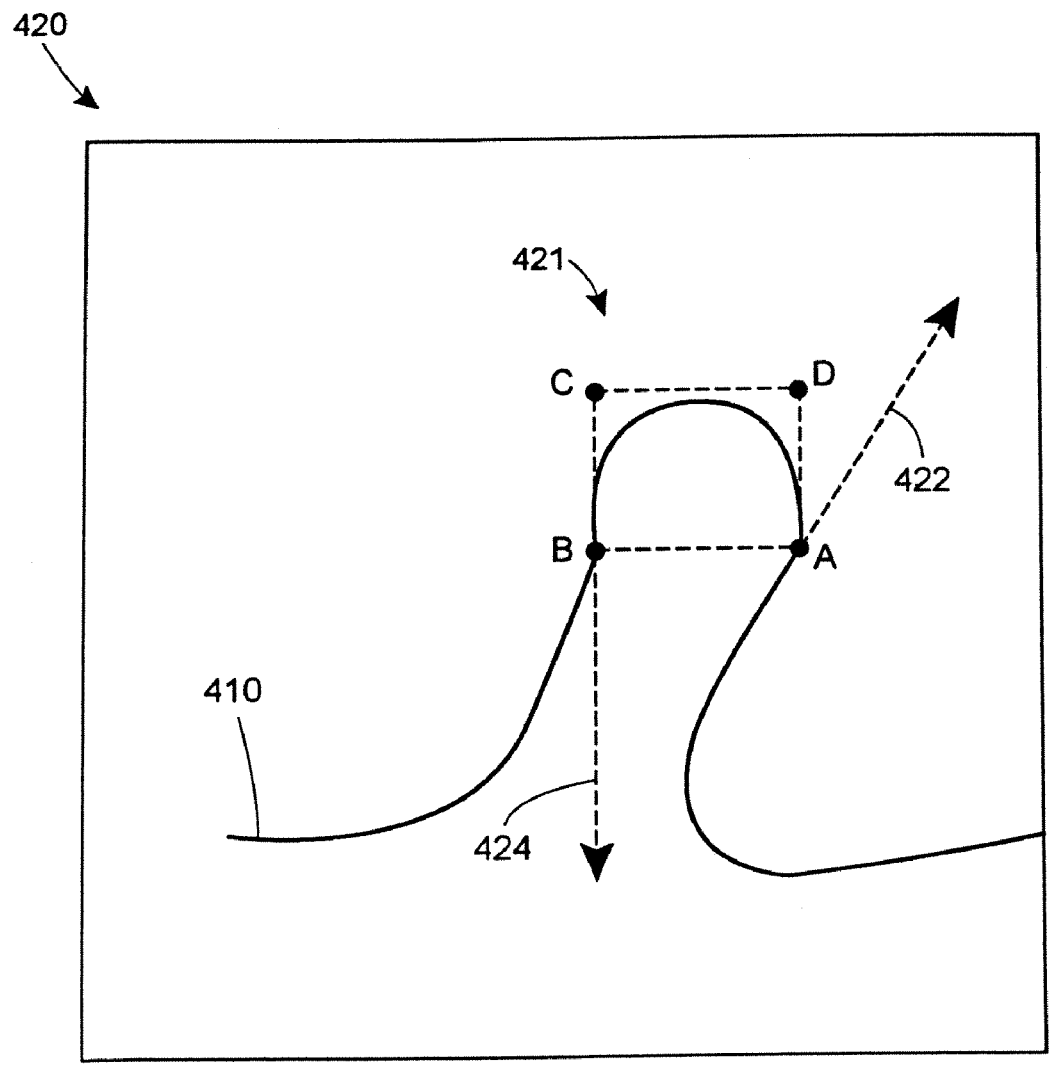
FIG. 5 graphically illustrates a portion of a route and an example of how a heading change may be based on an area ratio bounded by points A, B, C & D.

Another navigation parameter which the route evaluation system checks for is "heading change per area" as illustrated in FIG. 5. Vehicle heading at the turn entry point A and at the turn exit point B are determined in a manner similar to the manner described above. Additionally, two points C and D are also used to calculate an area in which the entire section of the route between points A and B is contained. Points C and D may be determined by a line which is tangent to the curved portion 421 and parallel to the line defined by points A and B. Although the area depicted in FIG. 5 is essentially rectangular in shape, any polygon shape may be used to calculate the area within which the heading change takes place. The number of additional points required is dependent upon the shape of the polygon chosen. The route evaluation system calculates the heading change from point A to point B and divides by the area contained within the polygon defined by points A, B, C and D. As described above, in relation to FIG. 4, the process may be iteratively repeated for a plurality of points along the route until the most constraining value of "heading change per area" is determined. Alternatively, each instance of "heading change per area" exceeding a certain predetermined threshold, as selected by the user, along the route may be returned for display on the display/interface device 22.

Figure 6:
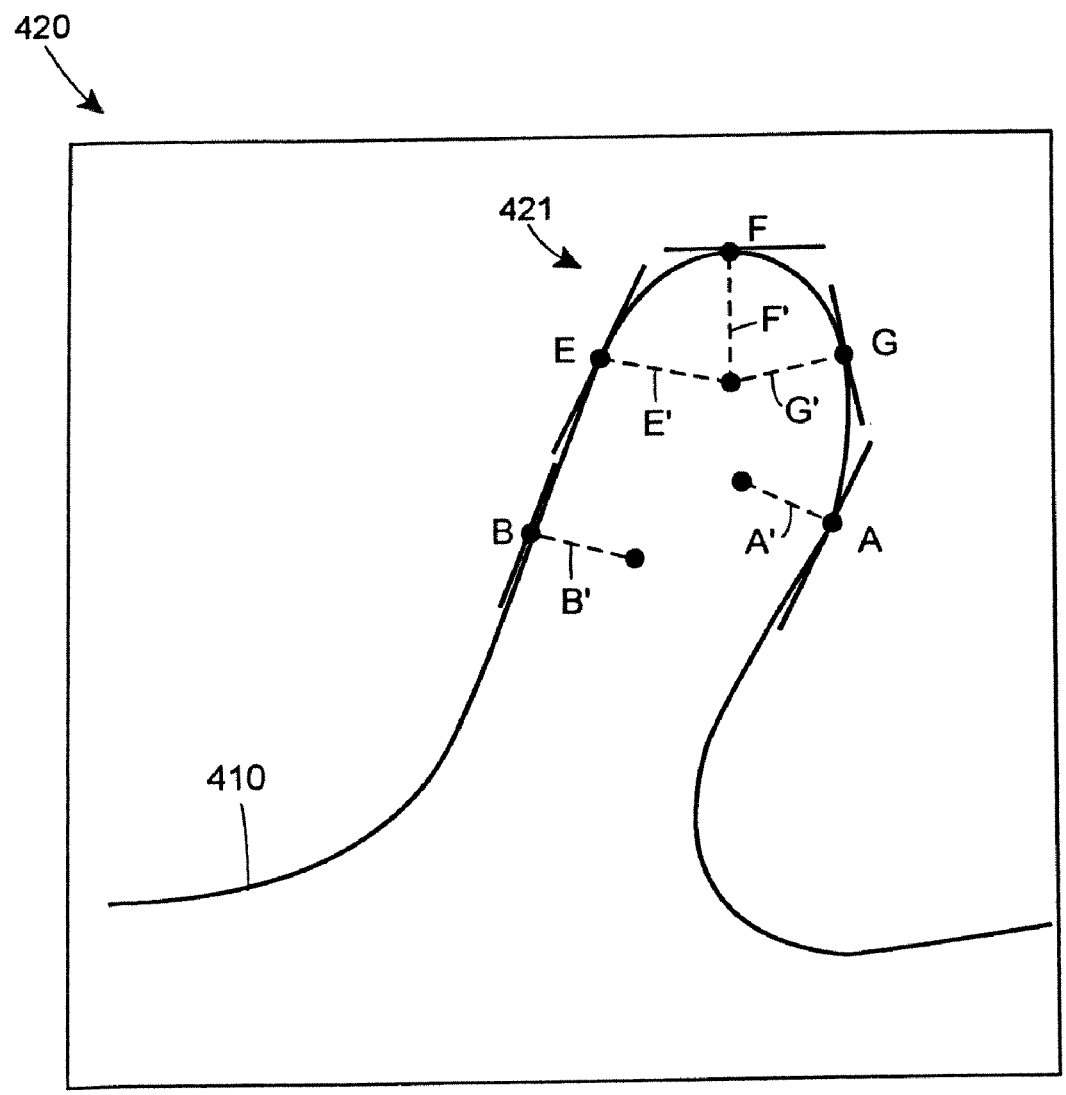
FIG. 6 graphically illustrates a portion of a route and minimum sustained radius of curvature.

Another navigation parameter that may be determined for the curved portion 420 of the route is the minimum radius of curvature. Referring now to FIG. 6, the route evaluation system calculates lines A, B, E, F and G which are tangent to the curved portion 421 of the route at a plurality of points along the curved portion 421 of the route. The route evaluation system then calculates radii A', B', E', F' and G' which correspond to radii of circles to which the lines A, B, E, F and G respectively, are tangent. The route evaluation system may use any acceptable method for calculating the radii. One such example is to use the following equation:

$$\rho = \frac{\left[1 + \left(\frac{dy}{dx}\right)^2\right]}{\frac{d^2y}{dx^2}}$$

where $\rho$=the radius of curvature, y and x are the Cartesian co-ordinates at the selected point A, B, E, F or G, and $$\frac{dy}{dx} \text{ and } \frac{d^2y}{dx^2}$$

are various derivatives of a function of a curve at the desired point A, B, E, F, or G. Of course, one skilled in the art can determine alternate methods of calculating the radii A', B', E', F' and G'.

Once the radii A', B', E', F' and G' are calculated, the route evaluation system determines which radius is smallest and assigns it as the controlling minimum turn radius for the curved portion 421 of the route. Alternatively, the route evaluation system may return any radius below a threshold value, selectable by the user, to the display/interface device 22. For example, a vehicle has a known minimum turning radius, and using known mathematical principles one can readily determine whether the calculated minimum radius if curvature is within the vehicle maneuverability parameter (e.g., the minimum turning radius) for that particular vehicle. Additionally, the minimum radius of curvature may be greater than, but only marginally greater than, the vehicle's known minimum turning radius, creating a certain margin of error for the curved portion 421 of the route. The vehicle operator and/or dispatcher may determine whether the vehicle operator has the necessary skill to complete the chosen route within the margin of error as identified by the system. In this way, the system may check the route in an objective manner and a subjective manner. Objectively, the system identifies portions of the route which are physically impossible for the vehicle to complete (e.g., the minimum radius of curvature is less than the vehicle's minimum turning radius) and subjectively, the system identifies portions of the route which satisfy the vehicle maneuverability parameters, but may require an experienced vehicle operator to navigate the route (e.g., the minimum radius of curvature is within 10 percent of the minimum turning radius of the vehicle).

Referring momentarily back to FIG. 2, the route evaluation system may check for overpasses on the route at 220. The route evaluation system accomplishes this check by searching the database for any roadways or railways that cross the route and further searches for overpass flags in the database. These overpass flags may be an actual symbol or value assigned to the intersection, or the route evaluation system could determine that an overpass exists at a roadway crossing if both the route and the roadway which crosses the route are not at the same elevation. Further, if the crossing roadway is at a higher elevation than the route, an overpass exists along the route and the user would be notified appropriately. In each case above, the entire route is evaluated for the navigation parameters. Because the roadway data is essentially a collection of points, which taken together represent roads, each navigation parameter is computationally evaluated at each point along the route.

Additionally, the route evaluation system may be configured to optimize other parameters. These other parameters include, but are not limited to, minimizing the number of turns in a route, prioritizing highways over arterials and arterials over collectors, road classes, lane count and/or lane width and minimizing the number of turns from one low level road to another low level road.

FIG. 7 is an exemplary listing of vehicle maneuverability parameters, each of which may have some effect on the ability of a particular vehicle to successfully navigate a route. These vehicle maneuverability parameters are examples only, and are not meant to be an all inclusive listing of all possible vehicle maneuverability parameters. FIG. 7 also includes an exemplary listing of navigation parameters. The navigation parameters are not meant to be an all inclusive list, but simply an example of possible relevant navigation parameters. It will be appreciated that those of skill in the art may become aware of additional vehicle maneuverability parameters that may bear on the ability of a particular vehicle to negotiate selected navigation parameters. Similarly, those of skill in the art may become aware of additional navigation parameters that may be relevant to certain vehicle maneuverability parameters.

Figure 8:
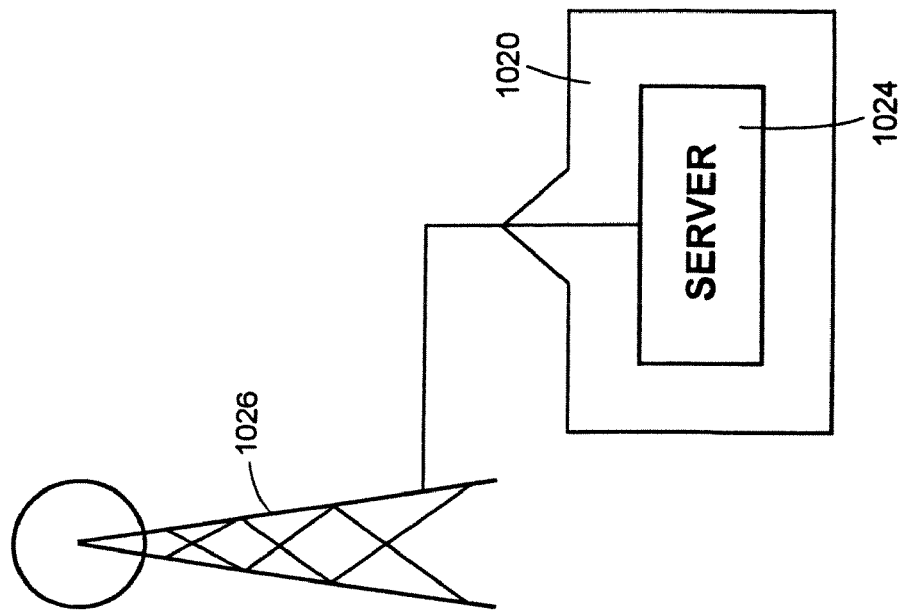
FIG. 8 is a schematic diagram of the route evaluation system of FIG. 1 interacting with a vehicle.
Figure 8:
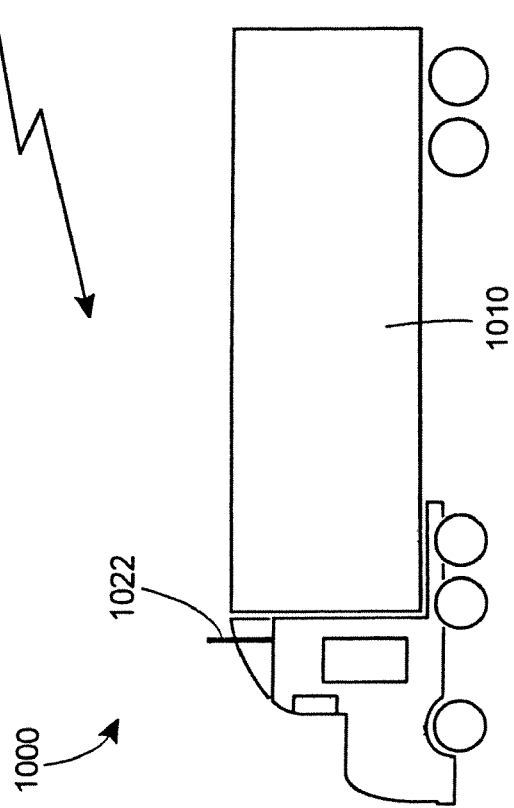

FIG. 8 is a diagram of an example shipping or delivery operation 1000. The delivery operation includes a vehicle 1010 and a dispatch facility 1020. While the vehicle 1010 depicted in FIG. 8 is a semi tractor trailer, it is understood that the vehicle 1010 may be any type of commercial or private vehicle. The vehicle 1010 includes an antenna 1022 that allows the vehicle 1010 to communicate with the dispatch facility 1020. This communication may be made through radio or other electromagnetic waves and may include an analog signal and/or a digital signal. Regardless, in the embodiment of FIG. 8, the vehicle 1010 includes a communication device (not shown) within the vehicle that allows the operator to communicate with the dispatch facility 1020 as previously mentioned. The communication device includes an input/output device which may be a display of some sort, a printer or a speaker. The input/output device allows the operator of the vehicle 1010 to input an origin and a destination and transmit the origin and destination to the dispatch facility 1020. The dispatch facility 1020 includes a computer or server 1024 of some sort which includes the route evaluation system described above. Once the computer or server 1024 has determined and analyzed the routes from the origin to the destination, the routes are transmitted back to the vehicle 1010 through the antennas 1022 and 1026 via electromagnetic waves. The operator of the vehicle 1010 may then select the best route available to the destination.

Figure 9:
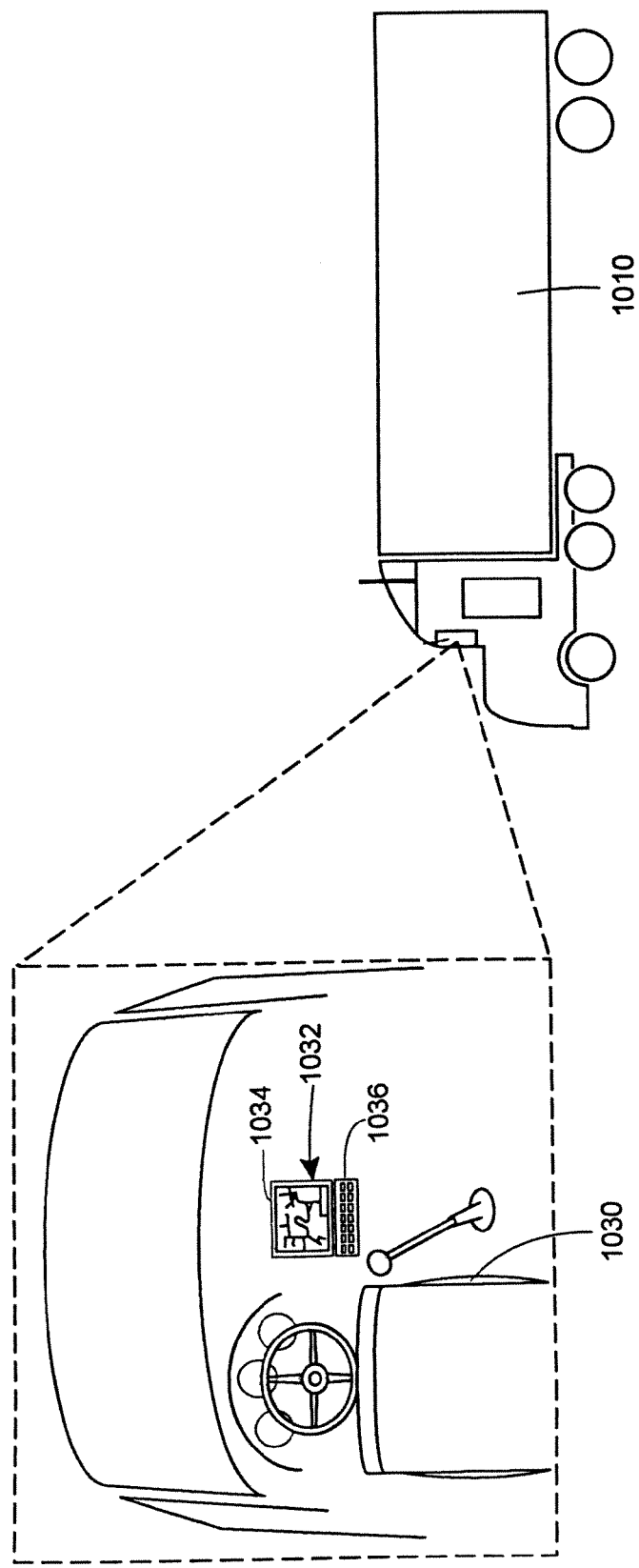
FIG. 9 is one possible location for display within a vehicle.

Alternatively, as shown in FIG. 9, the route evaluation system may be included in a computer onboard the vehicle 1010. The vehicle 1010 generally has a location 1030 for an operator and a computer system 1032 including the route evaluation system. The computer system 1032 may include a display 1034 of some sort and an input device 1036. The display 1034 may be an electronic display or a projection display. The display 1034 may include touch screen technology allowing the display 1034 to also function as the input device 1036. On the other hand, the input device may be a keyboard, a mouse or any other type of input device. The operator inputs an origin and a destination into the computer 1032 via the input device 1036. The computer 1032 determines and evaluates the routes as described above and returns the results to the display 1034 for operator viewing. The results may be displayed graphically, textually or a combination of the two. The operator of the vehicle 1010 then selects a preferable route.

In the embodiment described in FIG. 8, the dispatch facility 1020 may include a dispatcher who is responsible for asset allocation. For example, the dispatcher may be tasked with scheduling different sizes of vehicles and vehicle operators of different ability. In such operations, it may be useful for the route evaluation system to display route results in combination with asset availability. One example of such a display is illustrated in FIG. 10 and represented by the number 1100. The display 1100 includes several columns of data. For example, a route column 1110 includes a number assigned to each route computed and analyzed by the route evaluation system. The code column 1112 includes codes for the route difficulty 1113 and equipment 1113'. In the example of FIG. 10, the codes are:

R=Red, Y=Yellow, G=Green, L=Large, S=Small, X=Not Usable where Red, Yellow and Green are color codes which indicate relative difficulty for a particular piece of equipment, in this case a large or small truck. Column 1114 indicates what equipment is available. Column 1116 indicates what types of vehicle operators are available, for example experienced (EX) or novice (NO). Further, a legend 1118 is included at the bottom of the display 1100. The information on the display 1100 is used by the dispatcher to assign certain assets to certain routes. In this example, the dispatcher may have one large truck, one small truck, one experienced vehicle operator and one novice vehicle operator available for operations including the four routes displayed. Regarding route 2, the route evaluation system has determined that route 2 is impassable for a large truck. Therefore, the dispatcher already knows that the small truck must be assigned to this route. Other factors may influence the dispatcher's decision, such as cargo capacity of each truck and total cargo to be delivered. Further, the dispatcher may try to match the more experienced vehicle operator with the more difficult routes.

Alternatively, the route column 1110 and the code column 1112 may be transmitted directly to the vehicle operator of the vehicle. The vehicle operator may select a route based on his/her own experience. For example, a novice vehicle operator may select only green coded routes for the vehicle he/she is driving while an expert vehicle operator may select any route up to and including a red coded route for the vehicle he/she is driving. In this way, the vehicle operator may subjectively select the most appropriate route.

Although certain functions and features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A method of evaluating a route, comprising, on a computing device:

receiving an indication of an origin;

receiving, from a user, an indication of a destination;

receiving, from the user, a vehicle maneuverability parameter of a vehicle corresponding to an attribute of the vehicle that affects an ability of the vehicle to successfully traverse pre-existing roads;

determining a route from the origin to the destination based on roadway data from a database defining pre-existing roads for a geographical area including the origin and the destination;

obtaining a navigation parameter of the route based on the roadway data;

comparing the navigation parameter of the route to the vehicle maneuverability parameter; and assigning a route suitability score to the route based at least in part on the comparison between the navigation parameter and the vehicle maneuverability parameter.

2. The method of claim 1, wherein:
obtaining the navigation parameter comprises obtaining at least one navigation parameter selected from a group consisting of: a road width parameter, a curvature parameter, a road grade parameter, a weight bearing capacity parameter, an overpass indicator parameter, and at least one parameter corresponding to a local ordinance; and
receiving the vehicle maneuverability parameter comprises receiving at least one of: a length of the vehicle, a width of the vehicle, a height of the vehicle, a weight of the vehicle, a turning radius of the vehicle, a maximum road grade navigable by the vehicle, and a braking ability of the vehicle.

3. The method of claim 1, further comprising:
receiving, from the user, an operator parameter indicating at least one of a skill level or an experience level of an operator of the vehicle; and
assigning the route suitability score further based on the operator parameter.

4. The method of claim 3, further comprising:
determine, based on one or more corresponding navigation parameters, a margin of error for successful navigation of at least one portion of the route; and
assigning the route suitability score based on the operator parameter and the margin of error.

5. The method of claim 1, further comprising:
comparing the route suitability score to a threshold value; and
presenting the route on a display when the route suitability score indicates a suitability equal to or exceeding a suitability indicated by the threshold value.

6. The method of claim 1, further comprising:
identifying a portion of the route that has a corresponding route portion suitability score indicating the portion is more difficult for the vehicle to navigate than other portions of the route, and
at least one of graphically or textually distinguishing the portion on a display.

7. The method of claim 1, further comprising receiving, from the user, a weighting of the navigation parameter as compared to other navigation parameters, and assigning the route suitability score further based on the weighting.

8. The method of claim 1, further comprising:
determining multiple routes from the origin to the destination;
assigning a route suitability score to each of the multiple routes;
displaying an indication of each of the multiple routes in conjunction with an indication of a corresponding route suitability score.

9. The method of claim 1, further comprising:
receiving a user preference including at least one of:
a minimization of a total number of turns,
a priority of a highway over an arterial,
a priority of the arterial over a collector,
a road class preference,
a lane count preference,
a minimization of a number of turns from one low-level road to another low-level road,
a time of travel,
a distance of travel,
a heading change per distance traveled threshold,
a heading change per area threshold, or
a turn radius threshold; and
assigning the route suitability score further based on the user preference.

10. A dispatch system comprising:
a processor operatively coupled to a memory;
a database accessible by the processor and including roadway data defining pre-existing roads;
a display communicatively coupled to the processor;
one or more routines stored in the memory and executable by the processor to:
receive an indication of an origin and an indication of a destination;
obtain selected roadway data from the database;
determine a route from the origin to the destination based at least in part on the roadway data;
compute a set of navigation parameters for the route based at least in part on the roadway data;
obtain at least one vehicle maneuverability parameter for each of a plurality of vehicles, the at least one vehicle maneuverability parameter corresponding to an attribute of the each of the plurality of vehicles that affects an ability of the each of the plurality of vehicles to successfully traverse the pre-existing roads;
compare the set of navigation parameters to the at least one vehicle maneuverability parameter; and
assign a route difficulty score corresponding to the route for the each of the plurality of vehicles based at least in part on the comparison between the set of navigation parameters and the at least one vehicle maneuverability parameter.

11. The dispatch system of claim 10, wherein the one or more routines are further executable by the processor to present, on the display, an indication of the route, an indication of the each of the plurality of vehicles and an indication of a corresponding route difficulty score.

12. The dispatch system of claim 11, wherein the indication of the corresponding route difficulty score is color-coded.

13. The dispatch system of claim 10, wherein the at least one vehicle maneuverability parameter is selected from: a length, a width, a height, a weight, a turning radius, a maximum navigable road grade, and a braking ability.

14. The dispatch system of claim 10, wherein the one or more routines are further executable by the processor to present, on the display, an indication of an availability of the each of the plurality of vehicles.

15. The dispatch system of claim 10, wherein the one or more routines are further executable by the processor to determine a plurality of routes and to assign a route difficulty score corresponding to each of the plurality of routes for at least one of the plurality of vehicles.

16. The dispatch system of claim 10, wherein the one or more routines are further executable by the processor to present, on the display, an indication of an availability of an operator having at least one of a particular skill level or a particular experience level.

17. The dispatch system of claim 10, wherein the one or more routines are further executable by the processor to present, on the display, an indication of an additional dispatch factor, the additional dispatch factor selected from a group of additional dispatch factors including a cargo capacity of the each of the plurality of vehicles and a total cargo to be delivered.

18. The dispatch system of claim 10, wherein the set of navigation parameters includes at least one parameter selected from a group consisting of:
a road width parameter, a curvature parameter, a road grade parameter, a weight bearing capacity parameter, an overpass indicator parameter,
and a local ordinance parameter.

19. A method of evaluating a route, comprising, on a computing device:
receiving an indication of an origin and an indication of a destination;
determining a route from the origin to the destination based on roadway data from a database defining pre-existing roads for a geographical area including the origin and the destination and based on a first route optimization parameter;
receiving a second route optimization parameter;
analyzing the determined route with respect to the second route optimization parameter based on at least a portion of the roadway data associated with the determined route; and
assigning a route suitability score to the route based at least in part on the analysis of the determined route with respect to the second route optimization parameter.

20. The method of claim 19, wherein the first route optimization parameter comprises either a time of travel or a distance of travel.

21. The method of claim 19, wherein receiving the second route optimization parameter comprises obtaining a navigation parameter selected from a group consisting of: a road width, a curvature, a road grade, a weight bearing capacity, an overpass presence indicator, a railroad presence indicator, and at least one parameter corresponding to a local ordinance.

22. The method of claim 19, wherein receiving the second route optimization parameter comprises receiving a second route optimization parameter selected from:
a minimization of a total number of turns,
a priority of a first type of road over a second type of road,
a road class preference,
a lane count preference,
a minimization of a number of turns from one low-level road to another low-level road,
a heading change per distance traveled threshold,
a heading change per area threshold, or
a turn radius threshold.

23. The method of claim 19, wherein receiving the second route optimization parameter comprises receiving an indication of a user preference with respect to a route feature.

24. The method of claim 19, wherein analyzing the route based on the at least the portion of the roadway data comprises analyzing at least a portion of the route based on at least one of: a geodetic street coordinate, a shape geometry, a lane count, a lane width, a road width, a curvature, a road grade, a weight bearing capacity, an overpass presence indicator, a railroad presence indicator, a local ordinance, or an elevation.

* * * * *